(12) United States Patent
Einstein et al.

(10) Patent No.: US 7,242,664 B2
(45) Date of Patent: Jul. 10, 2007

(54) HYBRID PROTECTION USING MESH RESTORATION AND 1:1 PROTECTION

(75) Inventors: David S. Einstein, Morganville, NJ (US); Yung-Ching Sha, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1036 days.

(21) Appl. No.: 10/158,713

(22) Filed: May 30, 2002

(65) Prior Publication Data

US 2003/0223359 A1 Dec. 4, 2003

(51) Int. Cl.
*G01R 31/08* (2006.01)

(52) U.S. Cl. ...................... 370/216; 370/228
(58) Field of Classification Search ............... None
See application file for complete search history.

(56) References Cited

U.S. PATENT DOCUMENTS

| | | | |
|---|---|---|---|
| 5,793,745 A * | 8/1998 | Manchester | 370/224 |
| 6,038,044 A * | 3/2000 | Fee et al. | 398/56 |
| 6,400,859 B1 * | 6/2002 | de Boer et al. | 385/24 |
| 6,760,302 B1 * | 7/2004 | Ellinas et al. | 370/228 |
| 6,795,394 B1 * | 9/2004 | Swinkels et al. | 370/222 |
| 2005/0036442 A1 * | 2/2005 | Saleh et al. | 370/216 |
| 2005/0185654 A1 * | 8/2005 | Zadikian et al. | 370/395.21 |

* cited by examiner

*Primary Examiner*—Duc Ho

(57) ABSTRACT

A method, architecture and service of providing a multiple tiered pricing structure for providing a first service level to priority traffic where the priority traffic is protected via a 1:1 protection system, and a second service level for non-priority or extra traffic, wherein the extra traffic is normally propagated via the protection path, and is protected using a mesh restoration technique in the event of failure of the protection path or use of the protection path by the priority traffic.

14 Claims, 3 Drawing Sheets

HYBRID PROTECTION USING MESH RESTORATION AND 1:1 PROTECTION

TECHNICAL FIELD

The invention relates to the field of communications systems and, more specifically, to a hybrid mesh and 1:1 protection, architecture and service.

BACKGROUND OF THE INVENTION

In a communications system requiring a very high uptime rate, a commonly used topology comprises redundant communications paths (e.g., two physically distinct optical transmission paths) to provide, thereby, a service path and a protection path to form a "1:1" protection system. In the event of a fiber cut or other damage that disrupts data traffic through the service path, the same data traffic may be rerouted through the protection path. In this manner, customer traffic is not interrupted.

In a mesh topology, each of a plurality of network elements or nodes within a communications network is connected to at least two other network elements or nodes. In this manner, a communications path provisioned between a start node and an end node may be satisfied using different groups of intermediate nodes. Thus, in the case of a failure in a communications path between two intermediate nodes, an alternate communications path may be established using other intermediate nodes.

SUMMARY OF THE INVENTION

The invention comprises a method, architecture and service for providing a first service level to priority traffic where the priority traffic is protected via a 1:1 protection system, and a second service level for non-priority or extra traffic, wherein the extra traffic is normally propagated via a protection path, and is protected using a mesh restoration technique in the event of failure of the protection path or use of the protection path by the priority traffic.

BRIEF DESCRIPTION OF THE DRAWINGS

The teachings of the present invention can be readily understood by considering the following detailed description in conjunction with the accompanying drawing in which.

To facilitate understanding, identical reference numerals have been used, where possible, to designate identical elements that are common to the figures.

DETAILED DESCRIPTION OF THE INVENTION

The invention will be described within the context of a communications network comprising a plurality of network elements or nodes arranged in, illustratively, a mesh topology. The invention contemplates the use of a portion of available network elements or nodes to form respective service and protection paths of a communication path having 1:1 protection. Priority traffic is carried by the 1:1 service path, while extra data traffic is opportunistically carried in the protection path or other communication paths through the mesh network. The invention generally provides for relatively rapid restoration of priority data traffic using the 1:1 protection scheme, and relatively slower restoration of non-priority or extra data traffic using a mesh restoration scheme or other scheme appropriate to the particular network topology employed. Service levels are established based upon the relative speed that traffic is restored.

Figure 1:
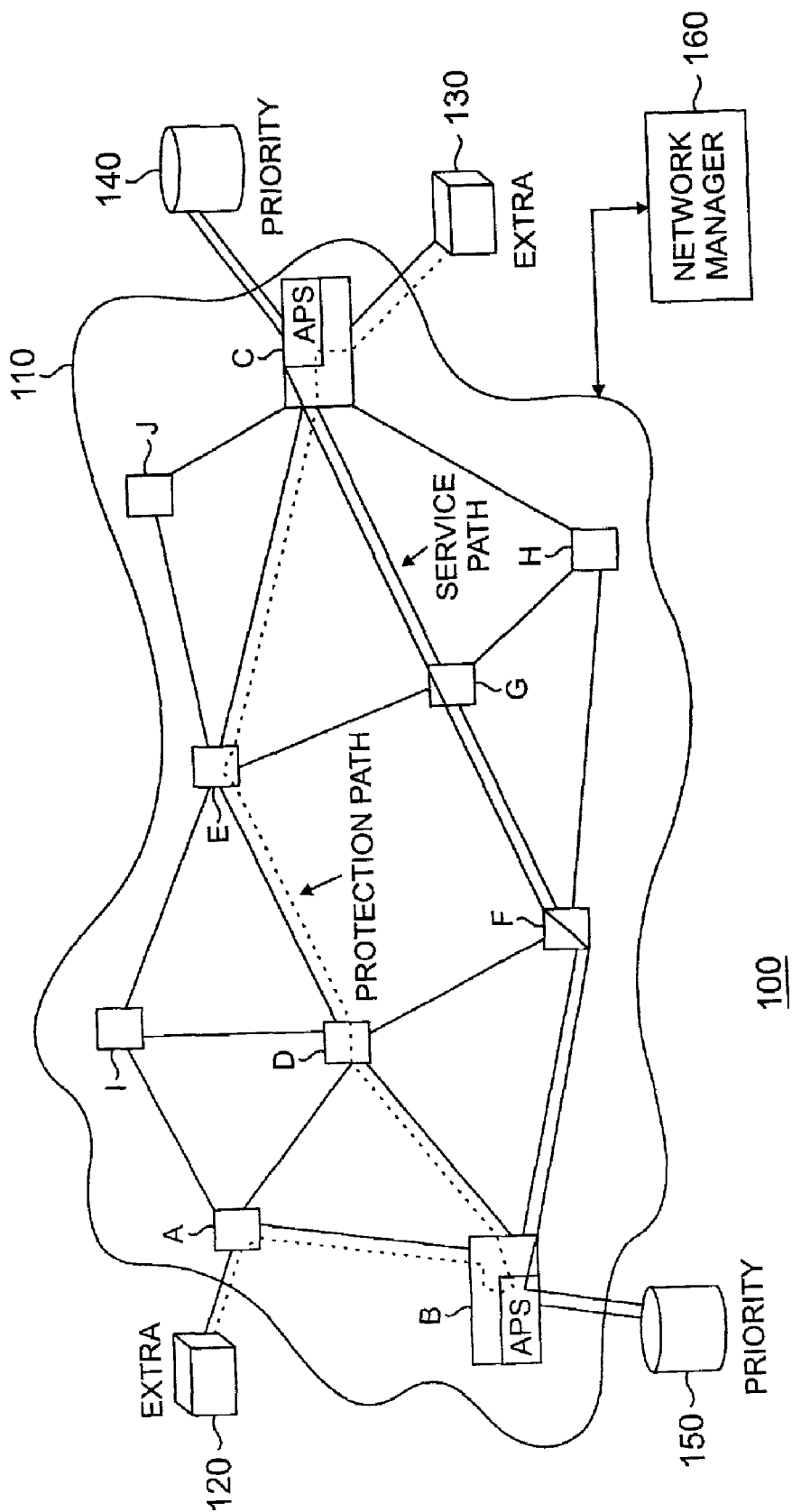
FIG. 1 depicts a high-level block diagram of a communications system utilizing the teachings of the present invention.

FIG. 1 depicts a high-level block diagram of a communications system utilizing the teachings of the present invention. Specifically, the communications system 100 of FIG. 1 comprises a mesh network 110 including a plurality of network elements or nodes wherein each of the plurality of nodes is typically connected to at least two other nodes. The network 110 communicates priority equipment traffic between first priority equipment 150 and second priority equipment 140. Similarly, extra traffic is communicated between first extra equipment 120 and second extra equipment 130. The operations of the mesh network 110 are managed by a network manager 160.

Within the context of the mesh network 110, a communications path initially provisioned through one sequence of network elements may be restored by rerouting the traffic through a different sequence of network elements in the event of a failure of the initial path. Specifically, the mesh network 110 is depicted as comprising ten network elements or nodes, denoted as network elements A–J. It will be appreciated by those skilled in the art that more or fewer network elements or nodes may be used within the context of a mesh network suitable for use within the context of the present invention.

The priority traffic path is provisioned using 1:1 protection as follows. A service path supporting the 1:1 protection path for the priority traffic is established using communications links between following sequence of network elements: node B to node F, node F to node G, node G to node C. Similarly, a protection path is established using the following sequence of network elements: node B to node D, node D to node E, and node E to node C. Each of nodes B and C includes a respective automatic protection switch (APS) that normally routes priority traffic through the service path and, in the event of a service path failure, preempts or "bumps" the extra traffic and routes the priority traffic through the protection path. Node B communicates with the first priority equipment 150, while node C communicates with the second priority equipment 140. The purpose of the 1:1 scheme is to enable substantially uninterrupted priority traffic between the first 150 and second 140 priority equipment. The priority and/or extra equipment is associated with, and optionally co-located with, a respective node.

The extra or non-priority traffic is provisioned as follows. Extra traffic is propagated using the above-described protection path and any additional network elements necessary to couple traffic between the first extra traffic equipment 120 and second extra traffic equipment 130. Thus, the first extra traffic equipment 120 communicates with node B via a path including a node A and a link therebetween.

In normal operation, priority traffic is propagated between the first 150 and second 140 priority traffic equipment via the service path (e.g., nodes BFGC), while extra traffic is propagated between the first 120 and second 130 extra traffic equipment via a communications path including nodes A, B, D, E, and C. In the event of a link, node or other failure on the path BFGC, (i.e., the path supporting priority traffic), the priority traffic is immediately rerouted to the protection path (e.g., BDEC). This rerouting of priority traffic occurs using the 1:1 protection scheme implemented by the automatic protection switches of the priority traffic end nodes (e.g., nodes B and C). This rerouting likely impacts the bandwidth available to support the extra traffic previously routed via the protection path BDEC. As such, the extra traffic must now be rerouted via an alternate path within the mesh network 110. The alternate path for routing the extra traffic is determined by the network manager 160 and comprises a sequence of nodes and respective communications links adapted to avoid inhibiting the quality of service (QoS) of the priority traffic. For example, the extra traffic may be routed via nodes AIEJC and their respective connecting links in the event of the protection path being used to support priority traffic, or in the event of the protection path itself having experienced a failure.

The network manager 160 comprises one or more hierarchal network management layers which operate together to perform such management tasks as provisioning communications links, determining or detecting link failures, restoring communications links or, alternatively, provisioning paths to avoid failed links. Other network management functions are also contemplated by the inventors and will be appreciated by those skilled in the art and informed by the teachings of the present invention.

Figure 2:
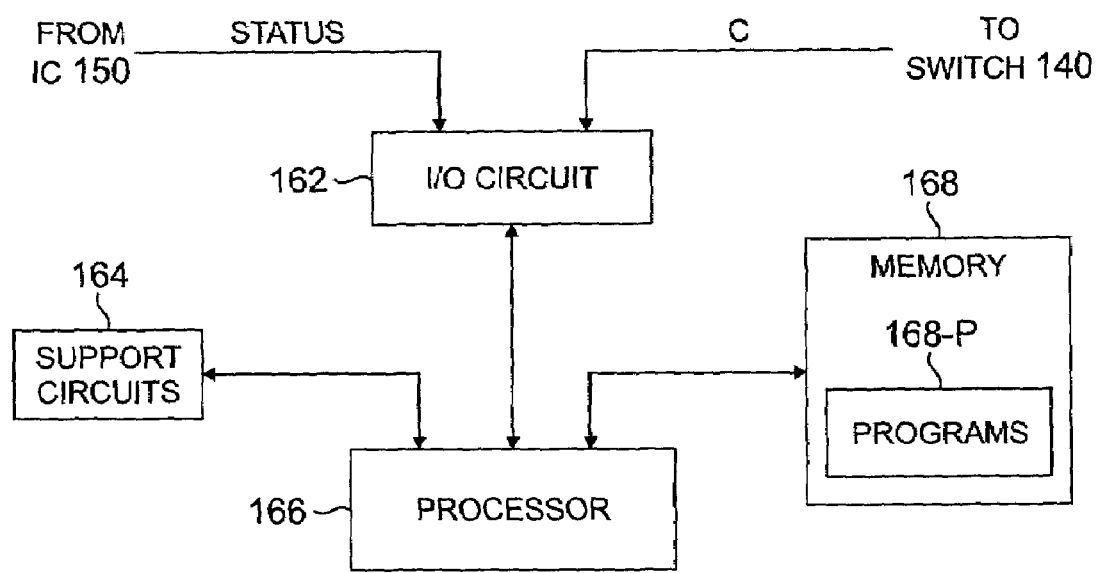
FIG. 2 depicts a high-level block diagram of a network manager or controller suitable for use in the communications system of FIG. 1.

FIG. 2 depicts a high-level block diagram of a network manager or controller suitable for use in the communications system of FIG. 1. Specifically, the exemplary controller 160 of FIG. 2 comprises a processor 166 as well as memory 168 for storing various control programs 168-P. The processor 166 cooperates with conventional support circuitry 164 such as power supplies, clock circuits, cache memory and the like as well as circuits that assist in executing the software routines stored in the memory 168. As such, it is contemplated that some of the process steps discussed herein as software processes may be implemented within hardware, for example, as circuitry that cooperates with the processor 166 to perform various steps. The controller 160 also contains input/output (I/O) circuitry 162 that forms an interface between the various functional elements within the mesh network 110 communicating with the controller 160.

Although the controller 160 of FIG. 2 is depicted as a general purpose computer that is programmed to perform at various control functions in accordance with the present invention, the invention can be implemented in hardware as, for example, an application specific integrated circuit (ASIC). As such, the process step described herein are intended to be broadly interpreted as being equivalently performed by software, hardware or a combination thereof.

Figure 3:
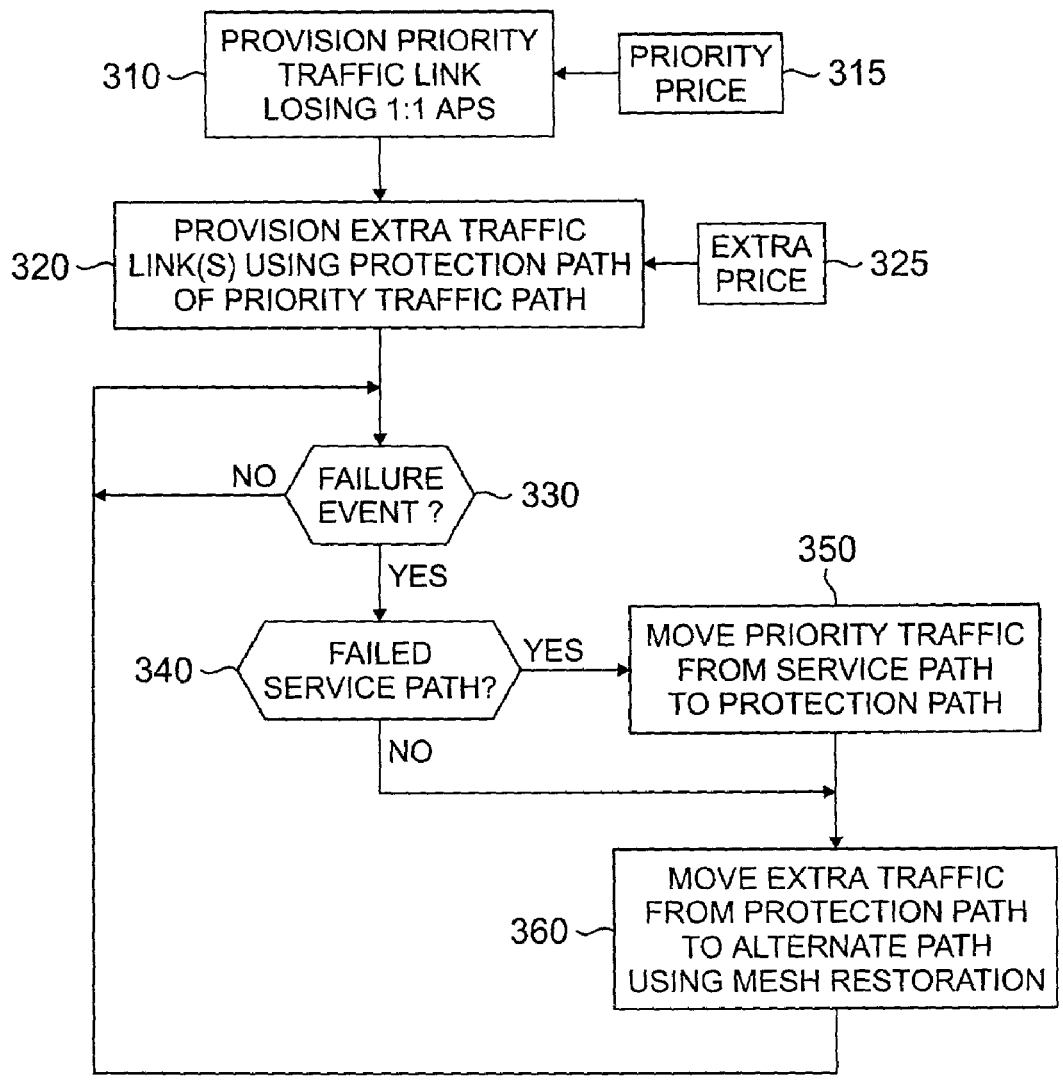
FIG. 3 depicts a flow diagram of a method according to an embodiment of the invention.

FIG. 3 depicts a flow diagram of a method according to an embodiment of the invention. Specifically, FIG. 3 depicts a flow diagram of a method 300 for implementing a plurality of service levels within the context of a communications network utilizing a hybrid mesh restoration and automatic protection switch (APS) traffic protection scheme.

A first service level comprises a priority service level. The priority service level has associated with it a relatively high QoS including a high uptime rate (i.e., a rapid restoration rate) enabled by the use of an automatic protection switch in each of the terminating nodes. A second service level comprises a non-priority or extra data traffic service utilizing a mesh restoration or other appropriate restoration scheme depending upon the type of network topology used. The second service level, in one embodiment, routes extra data traffic via the protection path supporting first service level or priority traffic. Second service level traffic must be rerouted in the event of first level traffic pre-empting or "bumping" the second level traffic from the protection path (i.e., in response to a service path failure) or in response to a failure within the protection path itself. The restoration techniques adapted to restoring second service level traffic are typically much slower than the 1:1 techniques utilized for first level traffic (e.g., one or more seconds versus tens of milliseconds).

First service level traffic comprises, for example, voice traffic, streaming video and/or audio and other traffic in which quality of service is critical. Second service level traffic comprises non-real time traffic (though audio-visual traffic may be supported with appropriate buffering), protected data traffic and the like. In the absence of selection of either the first or second service levels, traffic is routed as unprotected or regular traffic.

The method 300 is entered at step 310, when a priority traffic is provisioned using 1:1 automatic protection switches (APS) at respective terminating nodes. For example, referring to FIG. 1, node B includes an APS and operates as a first node or network element supporting a protection path and a service path in support of the priority traffic. Node C represents a second node or network element supporting the protection path and service path. It is noted in the exemplary embodiment that the service path traverses nodes B, F, G and C, and the protection path traverses node B, D, E and C.

Referring to box 315, a priority price is established in response to the relatively high cost of establishing two communications paths (service and protection) as well as an automatic protection switch (APS) in each of the initial and terminal nodes nor network elements within the communication path supporting the priority traffic. The priority of first service level price may be negotiated, variable or fixed.

At step 320, extra traffic is provisioned using one or more links within the protection path of the 1:1 protection. For example, referring to FIG. 1, non-priority or extra traffic is provided by the first extra traffic node 120 and enters the communications network 110 at node A and is propagated to node B, and then through the protection path to node C, and then to the second extra traffic node 130. It is noted that the extra traffic may be provisioned or propagated via many protection paths, and that these paths are associated with their priority traffic in service path. That is, in the described embodiment a single priority traffic link is shown in which a single protection path and corresponding single service path is established. However, in a mesh network comprising many network elements, many priority traffic links may be established in which respective service and protection paths are also established.

Referring to box 325, an extra price is established in response to the lower cost (compared to the above priority traffic) of provisioning the extra traffic. With respect to the priority price of box 315, and the extra price of box 325, it is noted that the priority price is higher due to the higher quality of service (QoS) requirements of the priority traffic; namely, the rapid restoration of priority traffic after a disturbance in the service path. As discussed herein, priority traffic is rapidly reestablished in the event of a service path fault (e.g., within 50 milliseconds) while the extra traffic "bumped" from the protection path is reestablished using a mesh restoration technique that inherently requires more time (e.g., one or more seconds).

At step 330, a determination is made as to whether a failure event has occurred. Specifically, at step 330, the method waits until such a failure event occurs. At step 340, after a failure event is noted at step 330, a determination is made as to whether a service path failure has occurred. If a service path failure has occurred, then at step 350 the priority traffic provisioned through the service path is instead propagated through the protection path.

After priority traffic is moved to the protection path, thereby "bumping" the extra traffic from the protection path or protection path portion (or in the event of a protection path failure as determined at step 340), at step 360 the extra traffic is moved from the protection path to an alternate path using mesh restoration techniques.

The above-described method contemplates a service in which two enhanced pricing tiers are established dependent upon the type of failure recovery provided. As an example, in the event of a cut or failure of a service path, the priority data normally propagated by the service path is rapidly switched to the protection path using the 1:1 APS scheme discussed above. The extra traffic that is normally propagated by the protection path is now "bumped" by the priority traffic. However, the extra traffic is restored using a mesh network restoration whereby an alternate path through the network is calculated and implemented by the network manager 160. Thus, extra data traffic normally carried via a path comprising nodes A, B, D, E and C is rerouted to an alternate path using a mesh restore technique, illustratively a path comprising nodes A, I, E, J and C. In a second example, the protection path carrying extra traffic experiences a failure. In this event, the extra traffic propagated via the protection path is rerouted using a mesh restoration technique.

Although various embodiments which incorporate the teachings of the present invention have been shown and described in detail herein, those skilled in the art can readily devise many other varied embodiments that still incorporate these teachings.

What is claimed is:

1. A method, comprising:
   propagating priority traffic through a first service path in a communications network arranged according to a mesh topology, said first service path having associated with it a corresponding first protection path, said first protection path being used to propagate extra traffic; and
   in response to a failure of said first service path, propagating said priority traffic through said first protection path and said extra traffic through an alternate path, wherein said extra traffic is reestablished on said alternate path using a mesh restoration, wherein said mesh restoration uses at least a portion of a second protection path associated with a second service path.

2. The method of claim 1, wherein said priority traffic comprises traffic having a quality of service (QoS) level above a threshold level.

3. The method of claim 2, wherein said threshold level comprises a restoration of priority traffic within approximately 50 milliseconds.

4. The method of claim 1, wherein said mesh topology comprises a plurality of network elements, each of said network elements communicating with at least one other network element via a respective communications path, wherein a portion of said communications paths comprise service paths.

5. The method of claim 1, further comprising:
   in response to a failure of said first protection path, propagating said extra traffic through an alternate path.

6. The method of claim 1, wherein each of said service and extra traffic paths have associated with them a respective quality of service level, each of said quality of service levels corresponding to a respective pricing level.

7. A method for use in a network element of a communications network arranged according to a mesh topology, said network element routing priority traffic via one of a first service path and a second service path, said first service path having associated with it a respective first protection path and said second service path having associated with it a respective second protection path, said method comprising:
   in response to a failure of said first service path, routing first service path priority traffic to a respective first protection path and routing extra traffic from said respective first protection path to an alternate path, wherein said extra traffic is reestablished on said alternate path using a mesh restoration, wherein said mesh restoration uses at least a portion of said second protection path associated with said second service path.

8. The method of claim 7, wherein said priority traffic comprises traffic having a quality of service (QoS) level above a threshold level.

9. The method of claim 7, wherein said priority traffic is re-established on said first protection path according to a 1:1 protection scheme.

10. The method of claim 7, wherein each of said service and extra traffic paths have associated with them a respective quality of service level, each of said quality of service levels corresponding to a respective pricing level.

11. A network architecture, comprising:
    a plurality of network elements arranged according to a mesh topology, each of said network elements communicating with at least one other network element via a respective communications path, wherein a portion of said communications paths comprise service paths having respective protection paths;
    wherein, in the case of a failure of a first service path propagating priority traffic, said priority traffic is routed to a corresponding first protection path and extra traffic previously propagated via the first protection path is routed to an alternate communications path, wherein said extra traffic is reestablished on said alternate communications path using a mesh restoration, wherein said mesh restoration uses at least a portion of a second protection path associated with a second service path.

12. A method comprising:
    establishing a first pricing level for propagating priority traffic through a mesh network according to a first 1:1 protection scheme; and
    establishing a second pricing level for propagating extra traffic through a first protection path supporting said first 1:1 protection scheme;
    wherein said extra traffic is restored using a mesh restoration technique in the event of said first protection path being unavailable, wherein said mesh restoration uses at least a portion of a second protection path associated with a second 1:1 protection scheme.

13. The method of claim 12, wherein said protection path is unavailable due to a failure in a service path supporting said first 1:1 protection scheme, wherein said priority traffic is switched to said first protection path.

14. The method of claim 12, wherein said first protection path is unavailable due to a failure of a node or link within said first protection path.

* * * * *